(12) United States Patent
Bayley

(10) Patent No.: US 8,979,431 B2
(45) Date of Patent: Mar. 17, 2015

(54) MOISTURE RESPONSIVE IRRIGATION METHOD AND APPARATUS

(71) Applicant: Canplas Industries Ltd., Barrie (CA)

(72) Inventor: Jeff Bayley, Midhurst (CA)

(73) Assignee: Canplas Industries Ltd., Barrie, Ontario (CA)

( * ) Notice: Subject to any disclaimer, the term of this patent is extended or adjusted under 35 U.S.C. 154(b) by 18 days.

(21) Appl. No.: 13/778,602

(22) Filed: Feb. 27, 2013

(65) Prior Publication Data

US 2013/0272791 A1   Oct. 17, 2013

(30) Foreign Application Priority Data

Apr. 17, 2012   (CA) ...................................... 2775140

(51) Int. Cl.
*A01G 25/02* (2006.01)
*A01G 25/06* (2006.01)

(52) U.S. Cl.
CPC ................ *A01G 25/02* (2013.01); *A01G 25/06* (2013.01)
USPC ................ 405/37; 405/45; 137/78.3; 239/63; 47/48.5

(58) Field of Classification Search
CPC ... A01G 25/06; A01G 25/167; A01G 27/003; E02B 13/00; F16K 31/001
USPC ............ 405/36, 37, 43, 45; 137/78.3; 239/63; 47/48.5
See application file for complete search history.

(56) References Cited

U.S. PATENT DOCUMENTS

| | | | | |
|---|---|---|---|---|
| 3,426,539 A | * | 2/1969 | Whear | 405/37 |
| 3,552,654 A | * | 1/1971 | Thomas | 239/145 |
| 3,898,843 A | * | 8/1975 | Waterston | 405/37 |
| 3,948,289 A | * | 4/1976 | Stephens | 138/37 |
| 4,061,272 A | * | 12/1977 | Winston | 405/45 |
| 4,095,750 A | * | 6/1978 | Gilead | 239/542 |
| 4,214,701 A | * | 7/1980 | Beckmann | 239/63 |
| 4,577,997 A | * | 3/1986 | Lehto et al. | 405/43 |
| 4,615,642 A | | 10/1986 | Mason | |
| 4,740,104 A | * | 4/1988 | Stohr et al. | 405/43 |
| 4,930,934 A | * | 6/1990 | Adkins | 405/37 |
| 5,152,634 A | * | 10/1992 | Maso | 405/45 |
| 5,660,209 A | | 8/1997 | Franz et al. | |
| 5,811,038 A | | 9/1998 | Mitchell | |
| 6,561,732 B1 | * | 5/2003 | Bloomfield et al. | 405/43 |
| 6,821,928 B2 | | 11/2004 | Ruskin | |
| 6,830,203 B2 | | 12/2004 | Neyestani | |
| 7,244,337 B2 | | 7/2007 | Bahlmann et al. | |
| 7,506,658 B2 | * | 3/2009 | Guest et al. | 137/78.3 |

(Continued)

*Primary Examiner* — Tara M. Pinnock
(74) *Attorney, Agent, or Firm* — Hoffmann & Baron, LLP

(57) ABSTRACT

An irrigation device comprising a moisture responsive barrier is provided. At least a portion of the barrier has perforations, at least some of the perforations are associated with a water swellable material. The perforations are configured to open as the water swellable material loses moisture and dries out and are configured to close as said water swellable material is exposed to and absorbs water, such as during a watering step. According to another aspect the irrigation method includes the steps of positioning a perforated barrier between a source of irrigation water and an area to be irrigated, wherein the perforations are associated with a water swellable material; exposing the water swellable material to water to cause the water swellable material to swell to close the perforations; and permitting the water swellable material to dry, to open the perforations, whereby the opening and closing of the perforations regulates the amount of irrigation water being applied across the barrier in the irrigation method.

13 Claims, 2 Drawing Sheets

(56) References Cited

U.S. PATENT DOCUMENTS

| | | |
|---|---|---|
| 7,517,586 B2 | 4/2009 | Fossum et al. |
| 7,690,391 B2 * | 4/2010 | Guest et al. .................. 137/67 |
| 7,954,732 B2 | 6/2011 | Shekalim |
| 2002/0124880 A1 * | 9/2002 | Tanikawa .................. 137/78.3 |
| 2005/0133613 A1 * | 6/2005 | Mayer et al. .................. 239/63 |
| 2011/0070028 A1 | 3/2011 | Sutton et al. |

* cited by examiner

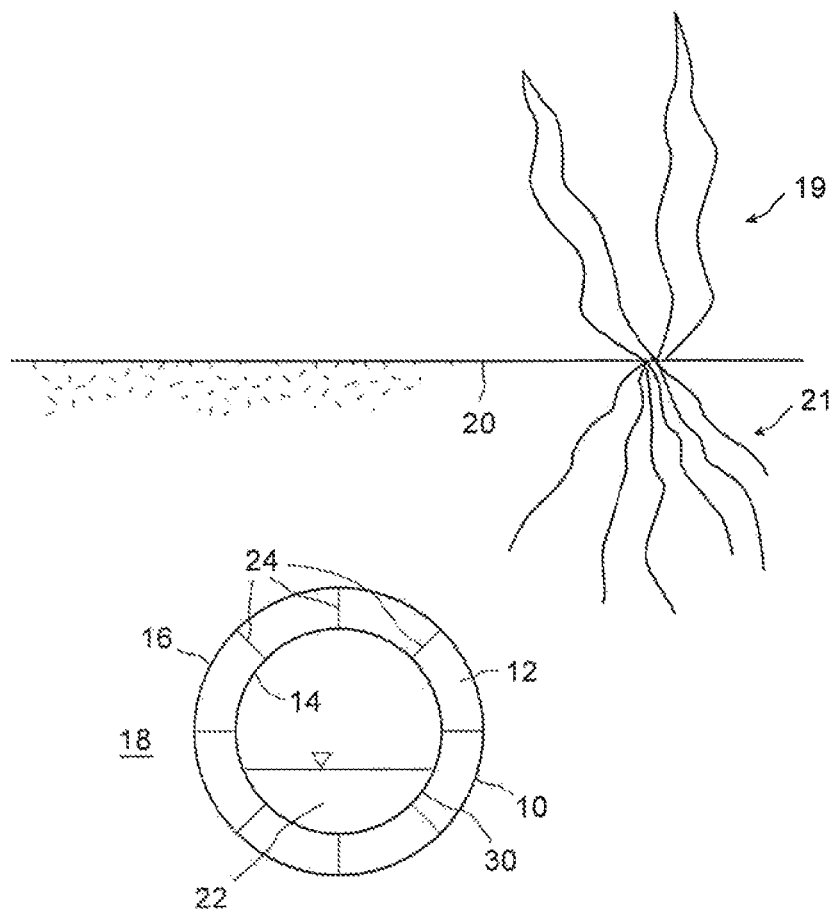
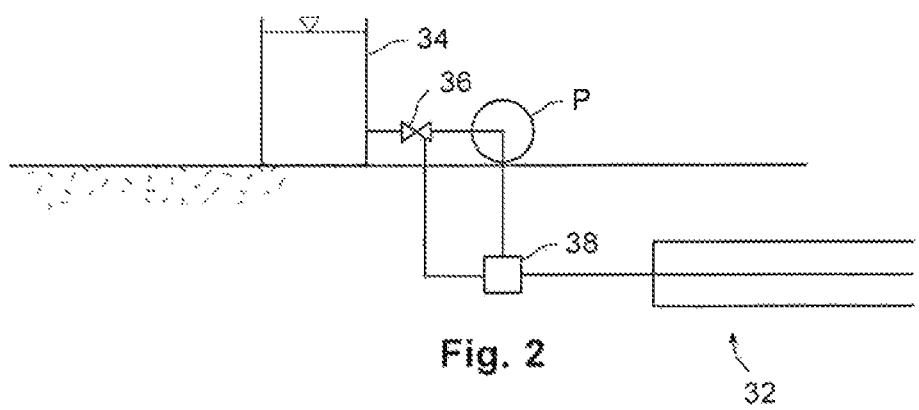

MOISTURE RESPONSIVE IRRIGATION METHOD AND APPARATUS

FIELD OF THE INVENTION

This invention relates generally to plant irrigation, and more particularly relates to ground water irrigation of the type that dispenses irrigation water for example through a hose or water conduit directly to the soil around the roots of plants to avoid evaporative losses and thus to conserve water for plant growth purposes.

BACKGROUND OF THE INVENTION

Humans have been cultivating crops since before recorded time. The earliest and most successful growing locations combined good growing conditions, such as plenty of water and sunlight with good fertile soil conditions. However, as the human population continues to expand, ever more crops are required. Out of necessity crop science advances have been made, including using fertilizer to make the soil more fertile and advancing plant and crop genetics to increase crop yields from the same acreage. As well many different types of irrigation systems have been developed to extend the amount of plantable area.

More recently global warming has become an issue. Global warming has the potential to alter, on a large scale, weather patterns, including the amount and location of rainfall. Predictions have been made of reduced rainfall in certain areas and desertification as a result in extreme cases. This could affect the ability to raise crops in large areas of what is now arable land.

Water consumption is also an issue. As the world population grows, more and more water is used for domestic as well as industrial purposes. While efforts are being made to treat the waste water that is produced, this is not always done appropriately. Water shortages are predicted by some in the future. Further, in certain soil conditions, surface watering can be counterproductive. For example, in southwestern Australia, subsurface salt has been brought to the surface by surface over watering, essentially sterilizing large areas to conventional crop growing, by increasing the surface salt levels to those at which crops will no longer grow.

One solution to a lack of water for agriculture in a region is to use large scale diversions of fresh water sources such as rivers, such as occur in the south western states of the USA. Another solution is to tap into underground aquifers and extract water from deep within the earth to use on the surface to grow crops. However, generally a location that has little or no water, such as a desert or semi desert, is also characterized by high evaporation rates, meaning that surface water evaporates quickly upon being exposed. Water that evaporates is no longer available for any plants or crops and is thus wasted from crop growing or an agricultural point of view. A significant amount of the water used in traditional surface sprinkler irrigation is lost through evaporation, before it can ever be used by the plants being watered.

As a result attempts have been made to use more direct and efficient watering methods which reduce the likelihood evaporation such as drip irrigation. In this technique, small feeder or water tubes are provided to each plant which drip water onto the base of the plant. However, while efficient in reducing the amount of water used, because it is applied in small amounts directly to the individual plants and root systems, there are still problems with water loss due to evaporation. For one, the rate of evaporation and the need for water varies depending upon the weather, the temperature, the relative humidity and the like. This, providing a steady drip rate will result in over watering in some cases and under watering in other cases. Providing a variable drip rate is very difficult.

In another attempt underground water lines have been used to feed water directly to the root systems of plants. However, these suffer from the invasion of fibrous roots seeking water which can block the tubes and disrupt the water distribution to the rest of the system. Underground delivery of the irrigation water may be preferred when the water contains bacteria, such as untreated grey water. In this case it is preferred to irrigate the plants without directly exposing surface plants and animals to any such potentially harmful bacteria.

What is desired is a form of water conserving watering system and method that is efficient in delivering irrigation water to plants, without exposing the water to excessive evaporation, which can deliver the correct amount to water as needed by the plant, and which is less vulnerable to the harmful and obstructive effects of roots and the like. Most preferably such a system would be simple and easy to use and located underground to mitigate the harmful effects of contaminated source water. Most preferably it would be largely passive and yet also automatically provide the correct amount of water that might be needed to optimize plant growth. Such a system would need to deliver the appropriate amount of water as and when needed according to the moisture conditions of the soil around the plants being so watered to be the most efficient.

SUMMARY OF THE INVENTION

The present invention is directed to a water efficient and non-evaporative irrigation system and a method of irrigating using the same. The invention allows the water to be directed to the plants according to the local and specific water demand of that plant as determined by the soil moisture content. In the event the soil and thus any plants in the soil have enough water, no more water will be delivered by the present invention to the plant until it needs more. This is accomplished automatically without the need for individual sensors or automated mechanical valves at each plant and thus provides an efficient, simple and yet elegant solution to the need for crop and plant watering.

In one aspect the present invention provides a water source, such as a reservoir or city water connection and a tubing network, such as a buried tubing network, to deliver the irrigation water to a particular subsurface area to irrigate the root systems of specific plants or to specific subsurface soil locations. Most preferably the tubing network is arrayed in a pattern which permits the wide distribution of water as needed for providing water to the roots of a crop.

The tubing network can be comprised of permeable and impermeable portions. The permeable portions are located adjacent to the plants to be watered and the impermeable portions are for transporting the irrigation water between the reservoir or water source to the permeable portions. Most preferably the permeable portions are selectively permeable and respond to local moisture conditions, such as the wetness or moisture content of the adjacent soil-letting more water through when the soil is dry and less water through when the soil is wet. Perforations are provided through the tubing wall and a water swellable material, such as water swellable plastic is used in association with the perforations to permit the perforations to open when dry and to swell shut when wet. A water level sensor can be used to detect the presence of water within the network, say at an upstream location on the network, which will be an indication that the perforations are closed and that no water is getting through the perforations.

This means a wet soil condition adjacent to the perforations which have swelled shut. In this event a main supply valve can be shut off until the water level in the underground tubing network subsides, indicating a need for more irrigation by reason of the dry soil. In this event the water source can be activated again by opening the main valve and flooding the hose network with irrigation water.

An aspect of the present invention is that the network is self-regulating. Water will continue to drain into dry soil, until it becomes wet enough to cause the water swellable material to remain in sufficient contact with the moisture so as to react by swelling and thereby to cause the perforation to shut. Thus, areas that are damp (ie fully irrigated) to begin with will have closed or only slightly open perforations limiting further water flow whereas areas of dry soil will have fully open perforations to encourage a greater volume of flow of irrigation water and leading to a good soaking of the soil adjacent to such perforation.

Thus, according to a first aspect, the invention provides an irrigation system comprising an irrigation hose network for connecting to a source of water, said irrigation hose network including at least one section having a perforated hose body, said perforations opening and closing to control a flow of irrigation water through said perforations, a water sensor to sense when water is being retained in the hose network; and a shut off valve to shut off the flow of water into the hose network from the source of water when the water sensor detects that water is being retained.

According to a further aspect of the present invention there is provided an irrigation hose connectable to source of water and having a hose body, having at least a portion of the hose body including perforations, said perforations being associated with a water swellable material and being substantially open when said water swellable material is generally dry and being substantially closed when said water swellable material has swollen upon being exposed to water.

According to yet a further aspect the present invention there is provided a sheet of material having at least a portion of the material having perforations, and having a water swellable material associated with said perforations wherein said perforations are substantially open when said water swellable material is generally dry and being substantially closed when said water swellable material has swollen upon being exposed to water.

According to a further aspect of the present invention there is provided an irrigation method comprising the steps of positioning a perforated barrier between a source of irrigation water and an area to be irrigated, wherein said perforations are associated with a water swellable material; exposing said water swellable material to water to cause said water swellable material to swell to close said perforations; and then permitting said water swellable material to dry, to open said perforations, whereby the opening and closing of said perforations regulates the amount of irrigation water being applied in the irrigation method.

BRIEF DESCRIPTION OF THE DRAWINGS

Reference will now be made to preferred embodiments of the invention, by way of example only, by reference to the following figures in which:

FIG. 1 shows a cross section through a watering tube according to the present invention;

FIG. 2 is a schematic of a representative flow network according to the present invention;

DETAILED DESCRIPTION OF THE PREFERRED EMBODIMENTS

Figure 3:
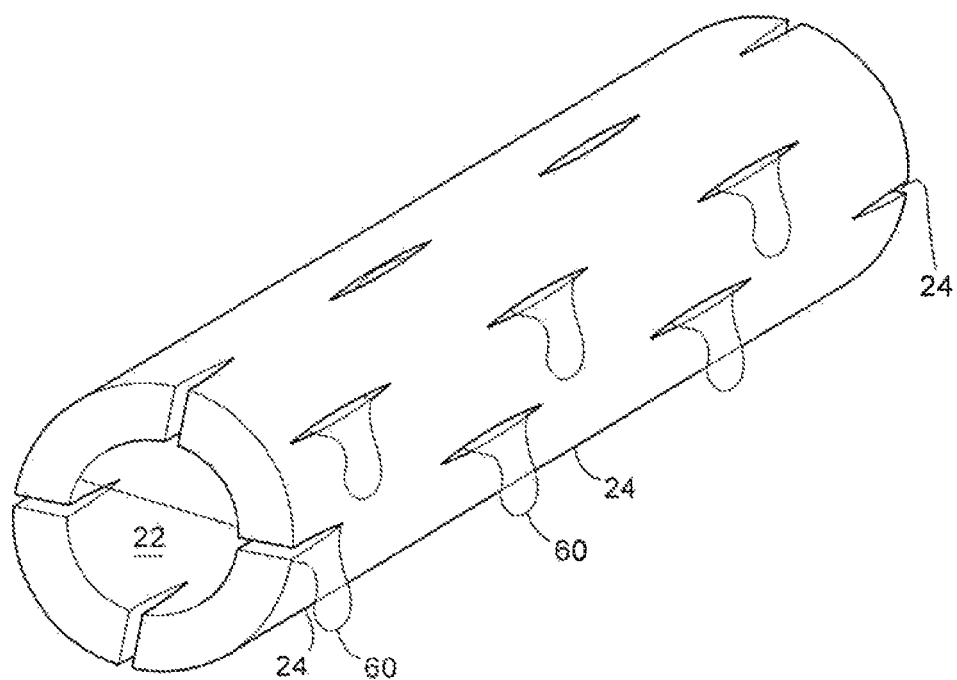
FIG. 3 shows the embodiment of FIG. 1 where the perforations are fully swelled shut.

FIG. 1 shows a cross section through a watering or irrigation tube 10 according to one embodiment of the present invention. The tube 10 includes a tube wall 12 and has an inside 14 and an outside 16. As shown the tube 10 is buried and so soil 18 is located outside of the tube 10. Also shown under the ground surface 20 is a plant 19 with a root system 21. While the tube 10 may also be used in an above ground application a buried application is preferred for the reasons set out below. Water, shown as 22, is partially filling the tube 10. Perforations 24 are also shown through which the water 22 in the tube 10 can pass, thereby wetting the soil 18 and watering the root system 21 of the plant 19.

The tube 10 includes a tube wall portion 22 which has special properties to allow the tube 10 to be self-regulating in terms of how much water is passed through the perforations 24 to the plant. In particular the tube 10 is formed from a water swellable material associated with the perforations 24. In this description the term associated means that the water swellable material is located in a position and in an amount to permit the swelling properties of the material to open and close a perforation as water is lost from the material or absorbed by the material respectively. It will be understood that the present invention comprehends many configurations of water swellable material that can be associated with the perforations to accomplish this function. In the most preferred embodiment the tube 10 can be largely composed of the water swellable material but in some cases it may be preferred to simply place the water swellable material around each perforation, such as by molding or the like and to use another less expensive or more dimensionally stable material for the balance of the tube 10. This might also be preferred when the other material is easier to work with or the like. However, the most preferred form of the invention is believed to be to form the entire tube 10 out of the water swellable material. If the water swellable material is placed around each perforation it may take a number of forms or shapes, such as a circle around the perforation, a mass on one side of the perforation, or on both sides of the perforation, or many other shapes and configurations and all of these are comprehended by the present invention. All that is required is that there be enough water swellable material placed close enough to the perforation and that the perforation be small enough so that the range of expansion of the water swellable material, when fully swollen, is enough to close the perforation. Also the range of contraction of the water swellable material has to be sufficient to permit the perforation to open when the material has shrunken.

The present invention comprehends using straight walled perforations, but other shapes are also comprehended. For example, the perforation may be configured with a flap which can more easily seal the perforation when swollen. Other configurations of perforations are comprehended, provided that as a result of the presence of enough water the perforation can close.

The present invention optionally includes a water impermeable liner 30. The liner 30 includes perforations which are aligned to the perforations 24 of the water swellable material forming the tube wall 12. The liner 30 is to prevent water within the tube 10 from being absorbed by the tube wall 22. In this manner the water swellable material in the tube wall 22 is responsive to the water content of the surrounding soil 18 than of the water within the tube 10. The liner can line the inside diameter of the tube, or, can extend also through the perforation. In this case, the liner will be flexible and will permit the perforation to close as the water swellable material swells.

FIG. 2 shows an irrigation network 32 according to the present invention. The network 32 includes a source of irrigation water 34, a water control valve 36 and a water level sensor 38. The network will ideally be in the form of a buried network as discussed above. Most preferably the network includes branches that run close to or adjacent to the roots of the plants or crops that are to be irrigated by the water system of the present invention. If the conditions permit, the network can be sloped down away from the source of the water 34 and the water can feed into the network by gravity drainage. The present invention also comprehends that a source of pressure may be provided to drive the water into the network, such as a pump P or the like, a natural head from an above ground reservoir or the network 32 can have a connection to a pressurized municipal water system. As will be understood by those skilled in the art the water system of the present invention will achieve the best results when water can be well distributed throughout the network and thus distributed widely and as needed to various crops for irrigation purposes. In a higher pressure system it may be more difficult to control the flow so low pressure systems are preferred.

The water level sensor 38 is preferably positioned in the network 32 at a location so that when the network is full of water, this condition can be detected. The sensor may be any form of electronic sensor moisture sensor, or it may be a non-electronic passive sensor such as a float switch. What is required is that the water level in the network can be determined so that when the network is full, the further flow of water can be shut off by actuating the water control valve 36. Further, when the network and tubes are dry then the valve can be opened to allow water to flow from the source throughout the network as needed.

The operation of the present invention can now be better understood. When the soil adjacent to the tube 10 is dry, the tube will also over time tend to dry out. When the tube dries out, the water swellable material will shrink opening or further opening the perforations 24. With the water control valve 36 shut, the water level will drop in the network 32 as the water drains out of ay of the perforations 22 that remain open. If in any region the soil 18 is wetter, then in that region the perforations 22 will not open as much or remain closed slowing down the local drainage rates and permitting the water to be directed to the drier regions being serviced by still open perforations within the network. Once the level detector detects that the water level in the network has dropped, then the water control valve can be opened and water allowed for flow from the source of water into the network. Again the driest portions of the network will have the most open perforations allowing them to be preferentially watered. Similarly wetter regions will require less water and in those locations the perforations will be less open and thus restrict the amount of water that will be allowed to pass out of the tube 10 into the soil 18. In this manner the present invention can limit over watering the soil 18 and the plants being irrigated.

Once the soil surround the tube 10 is wet, then the water swellable material will begin to absorb water from the soil, causing it to swell, and thus pinching off the perforations. This is a gradual process, and occurs over a period of time thus permitting a good soaking of the surrounding soil. The exact amount of time can vary by changing the type of water swellable material, the size of the openings or the like. Thus the present invention comprehends that the irrigation system can be tuned to match the preferred water demands of different crops in different soil conditions, as well as the drainage rates of different soils. This time delay can range from minutes, to hours, to days, as required.

Figure 4:
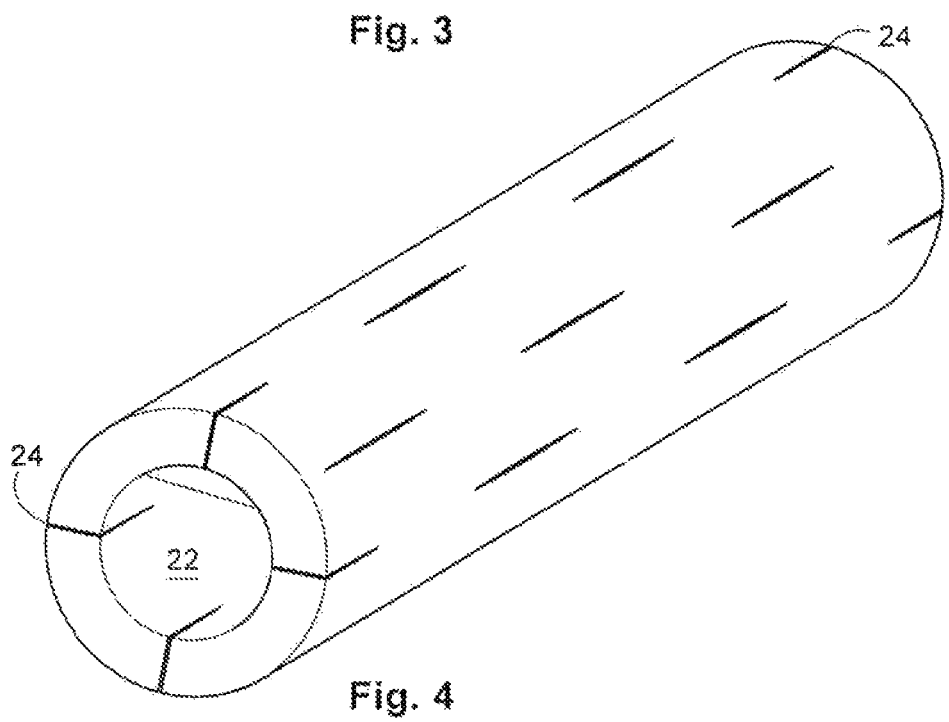
FIG. 4 shows the invention of FIG. 1 where the soil surrounding the watering tube is wet and the perforations are closed.

FIG. 3 shows the water 60 draining out of the perforations 24, which are open. As the perforations close, shown in FIG. 4, the water will begin to build in the network. At some point in the watering cycle, the water flow into the network will be greater than the water flow out of the network as more and more perforations close. As the water level rises in the network the water level sensor is tripped in turn causing the water control valve to shut off. This limits further water from being placed in the network allowing whatever residual water remains in the network to gradually drain. As well a drying cycle will begin whereas the soil dries out the swellable material will dry out and then begin to shrink. As it shrinks, the perforations will open and the water level in the network will drop until such time as the water level sensor is again tripped allowing water from the source of water to be sent into the network once more. As will be understood by those skilled in the art there may be a different set point for the level switch to open the valve to the source of water than to close the valve. In this way the control system for the delivery of water can be optimized and rapid open close cycles avoided.

As can now be understood the present water system is sensitive to external factors, such as rain. In the event of a rainstorm, the soil will be naturally wet and the water swellable material will remain swelled and the perforations will be kept substantially closed. Even if the water level in the network drops, the water will be restricted from escaping from the tube 10 into an area where the soil is already wet, due to the water swellable material remaining in a swollen or perforation blocking state meaning that the network will quickly fill up again and the water control valve will be activated to shut the valve from the source of water. As well, if there is a particular local area of the soil that remains wet for some reason, the perforations in that location will remain substantially closed, meaning that water will not pass out of the tube at that location where the water is not in any event needed. At other, dryer locations, the perforations will be more open, allowing water to pass out of the tube to moisten such dry soil.

The most preferred form of the present invention includes a water swellable material that takes some time to expand and contract. In this way there will be an ability to water a dry soil area for a period of time before the perforations close and stop the flow of water. In the most preferred form of the invention the time between opening and closing can vary from a few minutes to a number of hours. Because the water is draining out of the perforations for only a relatively small fraction of the time, it is anticipated that root in growth will be less of a problem with the present invention than for underground irrigation systems where there is always water in the system and the roots can grow into the system seeking the water. As well the closed perforations will make it less likely that a root will grow in through the perforation.

While a number of water swellable materials are known and may be suitable one of the most preferred is Nylon™ which does absorb water and swell. Alternatively, the water swellable material can be a composite such as a swellable material such as wood flour in a porous binder matrix. Alternatively, the present invention comprehends that the water swellable material may take the form of a separate structure which is held adjacent to the perforations such that when it swells it closes the perforation. The present invention comprehends that the water swellable material is exposed to and in contact with moisture in the surrounding soil so as to properly control the water level in the soil. However, the tubing material may be porous, either along certain sections, or through at least a portion of the tubing diameter so that soil moisture can have access to the water swellable material even if it is not in direct contact with moisture contained within the soil.

As well, the present invention comprehends allowing certain time to elapse between watering events. Thus, once the level switch shuts off the valve to the water supply, an override may be provided to prevent the valve from opening until a specified period of time elapses. The present invention comprehends that this time can vary between a few hours to a few days to a few weeks depending upon the plants or crops. In this way, the watering system of the present invention can be made responsive to local conditions such as the thirst of the crop, and the local soil drainage characteristics which could affect how often watering was warranted or desired.

Although the foregoing discussion has focussed on the use of the invention in a hose as part of an underground network configuration, it will be understood by those skilled in the art that the present invention also comprehends a sheet material form of the invention which includes at least a portion of the material being perforated with openable and closeable perforations, and in the most preferred form of the invention perforations that open and close in accordance to the presence or absence of water. In a sheet form it may be used as a moisture restricting barrier to control the flow of water between two locations. As a selectively permeable barrier it acts to mitigate water flow levels to improve the consistency of drainage for example. For example it might be used to dampen oscillations of flow volumes where that was desirable. In the sheet context the present invention would not be associated with a level sensor and a source of water but would be governed by the presence of water within the soil and as such water was flowing through the soil and through the moisture restricting barrier itself. Further, the sheet material could be rolled into a tube as described above to form the hose. Alternatively the hose could be made by being pulled out of a die, being molded or the like.

It will be understood that the foregoing description is by way of example only and that many variations and alterations to the invention are comprehended by this specification without departing from the broad scope of the invention as defined by the attached claims. Some of these variations are discussed above and others will be apparent to those skilled in the art. For example, while the preferred form of the invention is to use discrete perforations, the whole rube could be made porous, in the nature of a soaker hose. In that case the water swellable material surrounding the many small perforations would act in the same way as described above. Alternatively, the perforations could be made at distinct spacings, corresponding for example with the planting spacing for a row of crops.

I claim:

1. An irrigation device comprising a moisture responsive barrier wherein at least a portion of the moisture responsive barrier has perforations, at least some of said perforations being associated with a water swellable material wherein said at least some perforations are configured to open as said water swellable material loses moisture and said at least some perforations being configured to close as said water swellable material absorbs water, the opening and closing of said at least some perforations controlling the rate of flow of water through the perforations in accordance with local moisture conditions, wherein said moisture responsive barrier includes a water impermeable layer on at least one surface thereof.

2. An irrigation device as claimed in claim 1 wherein said moisture responsive barrier is formed into an irrigation hose and said impermeable layer is located on an inside surface of said hose.

3. An irrigation system comprising:
   a. an irrigation hose for connecting to a source of water, said irrigation hose having a hose body, at least a portion of said hose body having perforations, said hose body being swellable to cause said perforations to open and to close to control a flow of water through said perforations;
   b. a water sensor to sense the level of water in the hose body; and
   c. a shut off valve to shut off the flow of water into the hose body from the source of water when the water sensor detects the presence of water at a predetermined level.

4. An irrigation system as claimed in claim 3 wherein said perforations are associated with a water swellable material, which shrinks as it loses moisture to open said perforations and swells as it absorbs water to close said perforations.

5. An irrigation system as claimed in claim 4 wherein said water swellable material swells over a predetermined exposure time to water and said swelling closes said perforations.

6. An irrigation system as claimed in claim 5 wherein said predetermined swell time is sufficient to permit irrigation water to pass through said perforations to water an area adjacent to said perforations.

7. An irrigation system as claimed in claim 4 wherein said water swellable material shrinks over a predetermined time in the absence of water and wherein said shrinkage opens said perforations.

8. An irrigation system as claimed in claim 7 wherein said predetermined shrink time permits said perforations to open when an adjacent area to said irrigation hose has dried out.

9. An irrigation system as claimed in claim 3 wherein said water sensor detects a predetermined level of water in said hose body.

10. An irrigation system as claimed in claim 3 wherein said water sensor detects a rate of flow of water out of said hose body through said perforations.

11. An irrigation system as claimed in claim 3 wherein said shut off valve is activated when said flow of water through said hose body reaches a predetermined minimum flow rate.

12. An irrigation system as claimed in claim 11 wherein said shut off valve remains closed for a predetermined drying out time to permit water in said hose body to escape, and to permit said perforations in said hose body to open.

13. An irrigation system comprising:
   an irrigation hose connectable to a source of water and an inflow valve to regulate the flow of water into the irrigation hose,
   wherein the irrigation hose includes a series of perforations formed in a hose body and the hose body is water swellable to cause said perforations to swell shut upon exposure to water over a predetermined time.

* * * * *